US011586437B1

(12) United States Patent
Tripp et al.

(10) Patent No.: US 11,586,437 B1
(45) Date of Patent: Feb. 21, 2023

(54) DATA FLOW TRACKING IN PROGRAM VERIFICATION

(71) Applicant: Amazon Technologies, Inc., Seattle, WA (US)

(72) Inventors: Omer Tripp, San Jose, CA (US); Rajdeep Mukherjee, San Jose, CA (US); Michael Wilson, Seattle, WA (US); Yingjun Lyu, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 17/218,590

(22) Filed: Mar. 31, 2021

(51) Int. Cl.
*G06F 9/44* (2018.01)
*G06F 8/75* (2018.01)
*G06F 9/54* (2006.01)
*G06N 20/00* (2019.01)

(52) U.S. Cl.
CPC .................. *G06F 8/75* (2013.01); *G06F 9/54* (2013.01); *G06N 20/00* (2019.01)

(58) Field of Classification Search
CPC .............. G06F 8/75; G06F 9/54; G06N 20/00
USPC ................................................. 717/120–133
See application file for complete search history.

(56) References Cited

U.S. PATENT DOCUMENTS

| | | | | |
|---|---|---|---|---|
| 7,885,784 B2* | 2/2011 | Frank | ................. | A63B 71/0605 702/150 |
| 9,026,612 B2* | 5/2015 | Amit | .................... | G06F 16/972 709/217 |
| 9,208,061 B2* | 12/2015 | Guarnieri | ............ | G06F 11/3636 |
| 9,558,295 B2* | 1/2017 | Develyn | ................. | G06F 16/90 |
| 11,392,844 B1* | 7/2022 | Rao | ........................ | G06N 20/00 |
| 2018/0081789 A1* | 3/2018 | Pistoia | ................ | G06F 11/3604 |

OTHER PUBLICATIONS

Lou et al., "Mining Program Workflow from Interleaved Traces", 2010, ACM, pp. 613-622. (Year: 2010).*
Prahofer et al., "Opportunities and Challenges of Static Code Analysis of IEC 61131-3 Programs", 2012, IEEE, 8 pages. (Year: 2012).*
Mishra et al., "Asynchrony-Aware Static Analysis of Android Applications", 2016, IEEE, pp. 163-172. (Year: 2016).*
Nguyen Quang Do et al., "Explaining Static Analysis With Rule Graphs", 2020, IEEE, pp. 678-690. (Year: 2020).*

* cited by examiner

*Primary Examiner* — Ted T. Vo
(74) *Attorney, Agent, or Firm* — Nicholson De Vos Webster & Elliott, LLP

(57) ABSTRACT

Techniques for program verification are described. An exemplary method includes receiving a request to evaluate code based on a customized rule, the customized rule comprising one or more conditions for which the customized rule is applicable and one or more postconditions to indicate at least one check to perform for a given node in a graph for the code, wherein an application of the customized rule performs one or more of: an interleave between a backward analysis and forward analysis based on user-specified conditions, an analysis between sub-graphs by a query from a first sub-graph to a second sub-graph, and an operation on a sub-graph, storage of a result of the operation on the sub-graph, and usage of the stored result in a subsequent operation; generating a graph for the code; and evaluating the code by applying the customized rule to the generated graph.

20 Claims, 13 Drawing Sheets

| Method matchers | withMethodName | Accepts methods whose name matches the provided regexp. |
|---|---|---|
| | withParameterType | Accepts methods with a parameter that matches the provided regexp. |
| | withReturnType | Accepts methods whose return type matches the provided regexp. |
| | withThrowsDeclarations | Accepts methods with a throws declaration, where a thrown exception type matches the provided regexp. |
| | withCaller | Accepts methods being called by a method matching the provided regexp. |
| | withoutCaller | Accepts methods not called by any method matching the provided regexp. |
| | withTransitiveCaller | Same as withCaller, but generalized to transitive callers. |
| | withoutTransitiveCaller | Same as withoutCaller, but generalized to transitive callers. |
| Core operations | withInstrumentation | Interleaves an arbitrary, yet pure, function anywhere within the body of the rule that takes the intermediate match result as input. |
| | withMatchCountThresholding | Limits the match result per its provided parameters (for example, at least 3 elements, no more than 5 elements, and so on). |
| | withId | Loads the (intermediate) match result corresponding to the provided id. |
| | as | Stores the current match result under the provided id. |
| | reset | Resets the match result to all graph nodes. |

*FIG. 4*

| Filter predicates | withArgumentValue | Accepts action nodes with a matching argument (multiple overloads). |
| --- | --- | --- |
| | withArgumentByType | Accepts action and control nodes with an argument whose type matches the provided regexp. |
| | withoutArgumentByType | Accepts action and control nodes without any argument whose type matches the provided regexp. |
| | withReceiverByType | Accepts action nodes with a receiver whose type matches the provided regexp. |
| | withArgumentContext | Accepts action nodes with an argument whose definition occurs in the provided context. |
| | withConstantArgument | Accepts action nodes with a constant argument matching the provided regexp. |
| | withLowerCaseArgument | Accepts action nodes with a constant lower-case string argument. |
| | withUpperCaseArgument | Accepts action nodes with a constant upper-case string argument. |
| | withCatchClause | Accepts action nodes with a corresponding catch clause. |
| | withoutCatchClause | Accepts action nodes without a corresponding catch clause. |
| | withNumberOfArguments | Accepts action nodes with the provided number of arguments. |
| | withOutputIgnored | Accepts action nodes whose output is not used. |
| | withMethodCall | Accepts method calls matching the provided regexp. |
| | withAction | Accepts actions matching the provided regexp. |
| | withoutMethodCall | Accepts all elements in the input match result except method calls matching the provided regexp. |
| | withMethodCallGroup | Accepts a batch of calls if their names and ordering meets the provided specification. |
| | withoutMethodCallGroup | Accepts all elements in the input match result except batches of method calls that match the provided name and ordering specification. |
| | withNodeByType | Accepts all elements in the input match result whose corresponding AST node type matches the provided specification. |
| | withDeclaringType | Accepts method calls whose enclosing type matches the provided regexp. |
| | withContext | Accepts nodes that match the provided control context. |
| | withContextChain | Accepts nodes that match the provided control context hierarchy. |
| | withUser | Accepts data nodes that have users that match the provided regexp. |
| | withoutUser | Accepts data nodes that do not have any user that matches the provided regexp. |
| | withControlUser | Accepts nodes used by the specified control constructs (like do, while, and so on). |
| | withoutControlUser | Accepts nodes not used by the specified control constructs (like do, while, and so on). |
| | withDataFromParameter | Accepts nodes that receive data (transitively) from method parameters. |
| | withDataFromResult | Accepts nodes that receive data (transitively) from a value returned by the method. |
| | withDataFromId | Accepts nodes that receive data (transitively) from nodes contained in the match result mapped to the provided id. |
| | withoutDataFromId | Accepts nodes that not not receive data (either directly or transitively) from nodes contained in the match result mapped to the provided id. |
| | withIntraproceduralDataFromId | Same as withDataFromId, but with the restriction to local data flow (that is, not permitting data flow across method calls). |
| | withoutIntraproceduralDataFromId | Same as withoutDataFromId, but with the restriction to local data flow (that is, data flow across method calls is allowed). |
| | withDownstreamConditionalCheck | Accepts nodes whose data flows (transitively) into a conditional check (including loop tests). |
| | withReceiverId | Accepts action nodes whose receiver is contained in the match result mapped to the provided id. |
| | withCaughtException | Accepts an action node if its evaluation is protected by a catch clause where the exception type matches the provided regexp. |
| | withExactlyMatchedCatchClauses | Accepts an action node if the caught exceptions it corresponds to subsume all the exceptions that it is declared to potentially throw. |
| | withoutExactlyMatchedCatchClauses | Accepts an action node if the caught exceptions it corresponds to do not subsume all the exceptions that it is declared to potentially throw. |
| | withCompatibleCatchClauses | Same as withExactlyMatchedCatchClauses, but with the relaxation that the caught exception types could be more general (not precise). |
| | withoutCompatibleCatchClauses | Same as withoutExactlyMatchedCatchClauses, but with the relaxation that the caught exception types could be more general (not precise). |
| | withDataByType | Accepts nodes whose data type matches the provided regexp. |
| | withDataFromPackage | Deprecated. |
| | withoutDataFromPackage | Deprecated. |
| | withDataByName | Accepts nodes whose name matches the provided regexp. |
| | withReturnValue | Accepts data nodes that are (potentially) returned by the method. |
| | withReassignment | Accepts data nodes that are (potentially) re-assigned. |
| | withoutReassignment | Accepts data nodes that are not re-assigned. |
| | withAssignment | Accepts action nodes matching the provided regexp whose return value is assigned to a local variable. |

*FIG. 5*

| | | |
|---|---|---|
| Transformer operations | then | Transforms nodes in the input match result to the nodes that occur after those nodes per the graph's control flow. |
| | thenOrCurrent | Same as then, but the happens-after relation is reflexive (that is, it includes the input nodes). |
| | withDefinitionTransform | Transforms nodes in the input match result to their definition (if exists). |
| | withArgumentTransform | Transforms action nodes in the input match result to the specified data argument(s). |
| | withReceiverTransform | Transforms method calls with a receiver to their corresponding receiver nodes. |
| Higher-order operations | withInterproceduralMatch | Performs interprocedural matching with the provided subrule. |
| | withIndependent | Runs the set of provided subrules independently, from the input match result, where the default semantics is conjunction (that is, all subrules should output a non-empty match result), and the output match result is the input. The default behavior can be overriden. |
| | withNegationOf | Negates the match result produced by the provided subrule. |
| | withOneOf | Runs the provided subrules from the input match result in the order in which they are specified, and returns the first non-empty match result (with short-circuiting semantics), or else the empty match result is returned. |
| | withOneOfPrefix | Same as withOneOf, but as the rule's prefix where the matching subrule is expected to also set the rule's name and comment. If none of the subrules returns a non-empty match result, then the default name and comment provided as additional arguments are used. |
| | withIndependentPrefix | Same as withIndependent, but as the rule's prefix where the matching subrule is expected to also set the rule's name and comment. If all subrules return a non-empty match result, then the default name and comment provided as additional arguments are used. |
| | withContextMatch | Applies the provided subrule to nodes whose control context matches the provided context. |

*FIG. 6*

DATA FLOW TRACKING IN PROGRAM VERIFICATION

BACKGROUND

Static data flow tracking is a form of program analysis that uncovers semantic code behaviors of interest, such as flow of untrusted data into a security-sensitive operation. Backward analysis tracks data to its origin(s), and forward analysis tracks data to its destination(s). Interleaving these two forms of analysis yields powerful reasoning capabilities, for example in tracking untrusted data into an operation, then tracking back from the operation to its receiver to check whether it is sensitive. There are multiple existing techniques and algorithms that perform such interleaving of forward and backward analysis.

BRIEF DESCRIPTION OF DRAWINGS

Various embodiments in accordance with the present disclosure will be described with reference to the drawings, in which:

FIGS. 4-6 illustrate exemplary API calls for the various operations and what action the API call causes.

DETAILED DESCRIPTION

Figure 1:
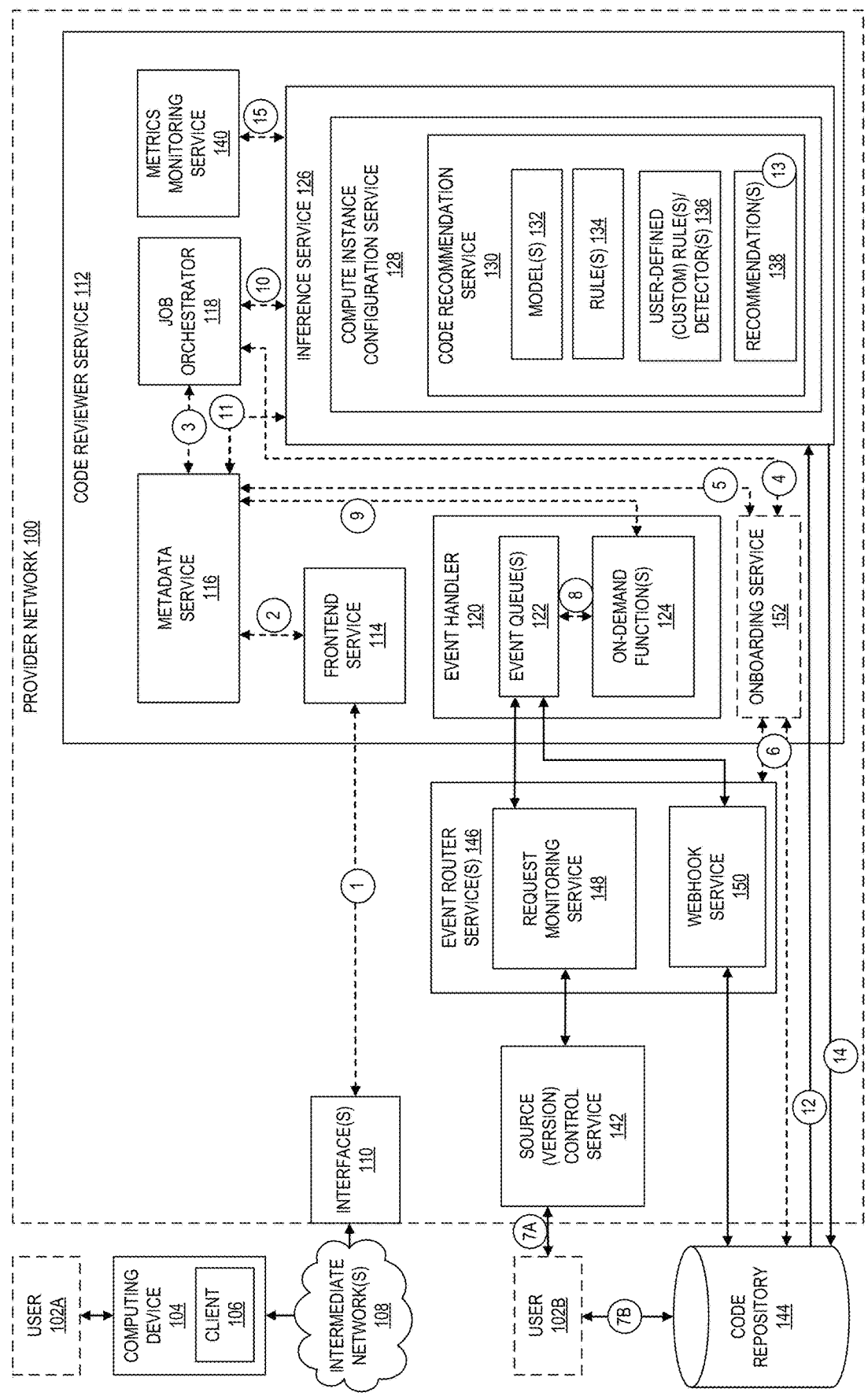
FIG. 1 is a diagram illustrating an environment for a code reviewer service according to some embodiments.

The present disclosure relates to methods, apparatus, systems, and non-transitory computer-readable storage media for a customizable code reviewer service to perform a customized rules-based evaluation of code to improve code quality. According to some embodiments, a customizable code reviewer service is disclosed that upon a user's request evaluates a user provided rule against source code. In particular, the custom rules described herein enables splicing, into code review, custom logic (operations). Such operations can include, for example, mapping the tracked data at a given reasoning step to other data or filtering the tracked data.

The evaluation of the rule may result in one or more of a determination successful rule evaluation, a determination of whether a precondition evaluation was successful, a last match result, a last non-empty match result (for example when rule evaluation fails), and an indication of the last operation evaluated. In certain embodiments, a code reviewer service disclosed herein helps users (e.g., developers) to write high quality (e.g., source) code and increases their productivity by providing recommendations during code reviews. Ensuring code quality is one of the most pressing problems faced by the software industry today. Lack of reliability and maintainability in production code can cause defects ranging from minor usability problems to causing an application to be unavailable for an extended period of time. Inconsistent coding practices and readability issues further delay remediation. Certain embodiments herein avoid only using manual code review and/or static analyzers, as they are cost-prohibitive and inefficient. For example, with a manual code reviews, code changes are typically reviewed by peers (e.g., humans). The iterative interaction required for peer code reviews delays code approval, often by days. As a result, organizations may either spend a large portion of development time on these activities or skip this step due to lack of expert reviewers or time constraints. This negatively impacts code quality and pace of innovation. In certain embodiment, a code reviewer service disclosed herein allows a developer (e.g., team(s) thereof) to improve the quality of their code and reduce the manual effort required for code reviews by taking advantage of actionable recommendations generated by the code reviewer service.

As used herein, the term "code repository" may generally refer to a source code repository that is hosted, for example, by a user or by a repository provider. As used herein, the term "pull request" may generally refer to a request that indicates the changed artifacts that a developer has made to a repository (e.g., branch) and shares that with other developers and services for various purposes (e.g., code review, merge, and/or recommendations). As used herein, the term "inference" may generally refer to the process of running a code recommendation service on a customer's code to generate recommendations. As used herein, "rules" may be a human curated and defined set of rules used to provide recommendations on a code repository. In certain embodiments, rules do not involve any machine learning, for example, but do utilize a dataset to run and validate the rules.

In some embodiments, rules are authored using a query language that breaks into several concrete objectives such as the ability to define, and encapsulate, semantic behaviors of interest in code (for example, whether the return value of a method call is checked downstream). Rules modeled as queries, where users can draw on their familiarity with popular languages like SQL. Rules are objects that are readable, maintainable, and amenable to optimization at the level of the evaluation engine (rather than on a per-rule basis). Rules are objects that can be ported, with minimal effort, to other programming languages.

FIG. 1 is a diagram illustrating an environment for a code reviewer service according to some embodiments. In this exemplary environment, a code reviewer service 112 includes a frontend service 114, a metadata service 116, a job orchestrator 118, an event handler 120, and an inference service 126. Code reviewer service 112 may include a metrics monitoring service 140 and/or an onboarding service 152. In certain embodiments, code reviewer service 112 receives a request to perform a review of source code, and uses the services and/or workflow systems therein to generate one or more recommendations 138.

In certain embodiments, frontend service 114 is the service that a customer uses (e.g., calls directly) via application programming interface (API) calls, via a console implemented as a website or application, etc. In one embodiment, this is the entry point for all the API calls that support onboarding and an on-demand inference for code review. In one embodiment, frontend service 114 is a (e.g., public facing) gateway that internally calls metadata service 116, and the metadata service 116 implements the different internal calls to the various components for the API calls. In one embodiment, frontend service 114 converts the user API calls to internal API calls of code reviewer service 112. An API may generally refer to an interface and/or communication protocol between a client and a server, such that if the client makes a request in a predefined format, the client should receive a response in a specific format or initiate a defined action. In a cloud provider network context, APIs can provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In certain embodiments, metadata service 116 is an (e.g., internal to code reviewer service 112 and not exposed to the user) control plane service that manages and keeps track of repository associations, on-demand recommendations, pull-requests, and/or feedback. In one embodiment, metadata service 116 provides an internal set of API calls that implement user (e.g., public) API calls and are called by frontend service 114. In one embodiment, metadata service 116 provides various internal APIs called by other (e.g., asynchronous) workflows such as onboarding and inference to manage and track related metadata. In certain embodiments, metadata service 116 is the service that manages all the metadata within code reviewer service 112. The term "metadata" may generally refer to data that provides information about other data.

In certain embodiments, job orchestrator 118 (e.g., job sweeper) is to sweep enqueued tasks for onboarding and inference, and trigger corresponding workflows. In one embodiment, the workflows are executed using a workflow service (e.g., workflow service 200 in FIG. 2) (e.g., a workflow service that builds distributed application using visual workflows) which runs various tasks depending on the workflow type.

In certain embodiments, event handler 120 (e.g., event handler service) is responsible for monitoring (e.g., event queue(s) 122) and processing various events such as pull-requests from customer code repositories, feedback on recommendations, etc. In one embodiment, event handler 120 performs validation of an event and then routes the event to its corresponding workflow (e.g., onboarding, inference, etc.) via metadata service 116.

In certain embodiments, onboarding service 152 is responsible for handling onboarding workflows which includes various steps to associate a code repository with code reviewer service 112. In one embodiment, onboarding service 152 sets up resources (webhooks, service linked role (SLR), etc.) used to monitor various events (e.g., pull requests, feedbacks) on a user's (e.g., customer's) repositories. In one embodiment for a pull request, onboarding service 152 checks that code reviewer service 112 (e.g., inference service 126 thereof) can be run and then posts recommendations as comments on the pull request. In one embodiment, onboarding service 152 sets up a pull request notification configuration with code repository 144 and/or a source code access configuration with code repository 144.

In certain embodiments, inference service 126 is responsible for running an inference on code, e.g., either for a pull request or on-demand for a code repository. In one embodiment for pull requests, inference service 126 posts recommendations 138 as comments on the pull request. In one embodiment for an on-demand request, inference service 126 stores the recommendations 138 (e.g., without any source code or source code snippets) which are then served (e.g., provided) via an inference API call.

In certain embodiments, environment in FIG. 1 includes a code repository 144 (e.g. and includes a code repository service to manage the code repository). Code repository 144 may be separate from code reviewer service 112 (e.g., separate from provider network 100). In one embodiment, code reviewer service 112 is to interact with code repository 144 (e.g., code repository service) to fetch the source code to be reviewed and any metadata to be utilized.

In certain embodiments, provider network 100 includes one or more event router services 146 to route the events happening in code repository 144 (e.g., an event of a pull request, feedback, etc.) to code reviewer service 112. The implementation of an event router service 146 can differ based on the type of code repository providers. For example, for an external code repository, event router service 146 may include a webhook service 150 that is responsible for routing the events into event handler 120 (e.g., event queue 122 thereof) of code reviewer service 112. As another example for an external code repository, event router service 146 may include a request monitoring service 148 with a rule configured to cause detection of an event to be sent to event handler 120 (e.g., event queue 122 thereof) of code reviewer service 112. In one embodiment, an event is an update of source code as indicated by source (e.g., version) control service 142, and request monitoring service 148 sends a corresponding event indication to event handler 120 (e.g., event queue 122 thereof) of code reviewer service 112.

As one example, a customer can configure the code reviewer service 112 to generate one or more recommendations 138 for source code repository 144 by setting up: (1) a pull request inference where a customer can onboard a given repository so that code reviewer service 112 posts code recommendations 138 on every pull request on that repository 144 and/or (2) an on-demand inference where a user's request (e.g., via a Create Recommendation Job API call) triggers an inference on a (e.g., entire) code repository 144 to create recommendations 138.

In certain embodiments, a code repository is onboarded by onboarding service 152 for monitoring by a customer providing a request that includes an identifier of the source code. In one embodiment, the user's request for an on-demand inference results in an asynchronous job with a job identification (ID) that fetches the source code from the repository 144 and performs an inference on the source code. In certain embodiments, once the job finishes, the customer can view code recommendations generated by the job, e.g., in a console or by a request (e.g., via a List Recommendations API call) that includes the job ID.

In certain embodiments, a customer can use an on-demand inference before and/or after onboarding the code repository for monitoring and code reviewing. In one embodiment, when a customer wants to enable recommendations on every pull request on their code repository in a code repository, they are to onboard their code repository by associating their code repository with the code reviewer service. This onboarding may include setting up the desired resources in provider network 100 (e.g., in code reviewer service 112 and/or event router services 146) and a customer's account that enables monitoring of the pull requests on their repository, running inference, and posting recommendations as comments on the pull request.

In one embodiment, onboarding is logically divided into two parts: (1) where a customer associates a particular repository as a repository to be monitored and (2) an onboarding workflow.

In certain embodiments of "(1) where a customer associates a particular repository as a repository to be monitored", a customer performs an associate repository API call. This may include selecting a repository (e.g., via a console) and calling the associate repository API. This may vary depending on the source control service (e.g., system) where the repository is being hosted. For example, when a customer lands on a coder reviewer console, the console may use a console impersonation token to list the one or more repositories accessible by the customer. Once a customer selects a repository, the console may then perform an associate repository API call signed using customer credentials. As another example, when a customer wants to enable code reviewing on its code repositories via a code reviewer console of code reviewer service 112, the customer may perform an authorization handshake (e.g., according to an industry-standard protocol) and provide the code reviewer service 112 an authorization token from the authorization handshake. Code reviewer service 112 may use this token to list the one or more repositories hosted for that user, and once a customer selects a repository, the console may then call (e.g., frontend service 114) associate repository API along with the token identifier (e.g., the identifier for the authorization token stored in the database). In one embodiment for calling an associate repository API, a customer is to create a personal access token (PAT) for the repository and pass it to associate repository API input.

In certain embodiments of "(2) an onboarding workflow", when a customer successfully calls an associate repository API on the frontend service 114, the code reviewer service 112 will enqueue a task with job orchestrator 118. In one embodiment, the job orchestrator 118 will then pick up this task and trigger a workflow for creating/configuring resources in a customer's account. Once the workflow successfully finishes, the repository association status will change to indicate "associated" and the customer onboarding is now successfully completed.

In certain embodiments, the type of resources created/configured by code reviewer service 112 depends on the customer's code repository (e.g., repository provider). In one embodiment, code reviewer service 112 supports a code repository hosted within provider network 100 or a code repository hosted external from provider network 100.

In certain embodiments, code reviewer service 112 supports a code repository that is managed by source (e.g., version) control service 142. Source (e.g., version) control service 142 may be hosted within provider network or external from provider network 100.

In one embodiment where code reviewer service 112 supports a code repository that is managed by source (e.g., version) control service 142, code reviewer service 112 is to create: a service linked role (SLR) where code reviewer service 112 is to use and assume this SLR during inference to clone the code repository, a system tag where code reviewer service's 112 SLR policy would only provide access to repositories with that system tag, and/or a managed rule in request monitoring service 148 to cause an event indication to be sent to event handler 120 (e.g., event queue 122 thereof) when a change (e.g., pull request) for the code repository is detected by request monitoring service 148.

In one embodiment where code reviewer service 112 supports a code repository that is managed separately from provider network 100, code reviewer service 112 is to: cause onboarding service 152 to call the repository's API (e.g., representational state transfer (REST) API) to configure the webhook for the Uniform Resource Locator (URL) of the code repository, create a webhook configuration in webhook service 150 to cause an event indication to be sent to event handler 120 (e.g., event queue 122 thereof) when a change (e.g., pull request and/or pull request comment) for the code repository is detected by webhook service 150.

In certain embodiments, after the onboarding such that all the resources (e.g., webhooks, SLRs etc.) are setup for the given repository of the customer, event handler 120 receives notifications once a pull request is posted on that repository. In one embodiment, the event handler 120 will then fetch the required metadata about the repository from the code repository 144 and then will call create recommendation job API of metadata service 116 to enqueue a job, e.g., with job orchestrator 118. In one embodiments job orchestrator 118 runs an inference task for the job with inference service 126 to generate code recommendations 138 (e.g. and posts the code recommendations 138 on the pull request).

In certain embodiments, a user (e.g., customer) sends an on-demand inference request for a (e.g., entire) code repository (e.g., via an API call to front end service 114) that triggers an inference job on a given code repository. In one embodiment, a user accessible API call (e.g., not limited to being an internally used API call of code reviewer service 112) is sent to the frontend service 114 that in turns calls a create recommendation job API of metadata service 116 to enqueue the job, e.g., with job orchestrator 118. In one embodiment, job orchestrator 118 runs an inference task for the job with inference service 126 to generate code recommendations 138 (e.g., provide the code recommendations 138 to the user).

Thus, for each job request (e.g., request to perform an inference to generate recommendations on source code from a repository), inference service 126 generates one or more recommendation 138 for the source code from the repository.

In some embodiments, the code reviewer service 112 (and other services shown in FIG. 1) is implemented as a service within a provider network 100. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 108 (e.g., the internet) via one or more interface(s) 110, such as through use of application programming interface (API) calls, via a console implemented as a website or application, etc. The interface(s) 110 may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service (e.g., on demand functions 124 in FIG. 1) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As an example high-level overview, each (e.g., inference) request to perform a review of source code triggers a separate compute instance (e.g., managed by compute instance configuration service 128) that runs code recommendation service 130 on the customer source code and generates recommendations 138. In one embodiment, if the inference is for pull requests, then these recommendations are posted on the pull request as comments. In one embodiment (e.g., when the inference is for an entire code repository), the recommendations 138 are stored (e.g., encrypted) in code reviewer service 112 (e.g., in metadata service 116) and provided to the customer via a list recommendations API. In one embodiment, a compute instance (e.g., container) is torn down after running inference (e.g., which deletes all the pulled customer code).

In one embodiment, inference service 126 fetches the source code artifacts, validates, and extracts features, e.g., by parsing the source code into a control flow and data flow graph. In one embodiment, the control flow and data flow graph represents the dependencies between program elements from the source code, e.g., the graph is rich in context about the various relationships including type usages, and both data and control flows between program elements that permit the design and development of complex and semantic rules. In one embodiment, the inference service 126 generates recommendations 138 by running a combination of various machine learning model(s) 132 and/or rule(s) 134 with code recommendation service 130, e.g., code recommendation service 130 executed within a sandboxed environment of a compute instance (e.g., a container).

In certain embodiments, code recommendation service 130 supports running various types of rules and/or detectors, e.g., from simple regular expression (regex) based to complex program/semantic analysis-based rules. Additionally, or alternatively, code recommendation service 130 supports running one or more machine learning models (e.g., a model trained a detector to predict issue(s) with source code). In certain embodiments, the code recommendation service 130 provides various abstractions to write the rules that work at method, file, or the entire project context to design and implement such various types of rules. In certain embodiments, the code recommendation service 130 provides an interface so that user-defined rules 136 can be written to work directly on the source code (e.g., in text form or on extracted features from the source code).

In one embodiment, code reviewer service 112 includes a metrics monitoring service 140 to capture various metrics of the code reviewer service 112, e.g., metrics on the running of different rules, ways to whitelist or run certain rules in shadow, and/or allow versioning of the rules (e.g., version 1, version 2, etc. as rules are modified).

In certain embodiments, for each recommendation (e.g., both for pull-requests and repository inference), provider network 100 (e.g., code recommendation service 130) stores certain metadata based on the source code without storing the actual source code from customer code repository. In one embodiment, this metadata allows a user/code reviewer service to gather metrics and will act as a feedback loop for a model(s), e.g., as customers provide their feedback on these recommendations. Non-limiting examples of this metadata are a recommendation identification (ID), code repository metadata (e.g., provider, repository-name etc.), and/or source of recommendation (e.g., identification of the rule(s) and/or model(s) used for the inference).

Next, an example usage of code reviewer service 112 is described with reference to encircled numbers "1" through "15" of FIG. 1. In certain embodiments, code reviewer service 112 (e.g., frontend service 114) receives a request to perform a review of source code at the circle "1", for example, with the request identifying the particular source code and/or code repository 144 storing the source code and including a user-defined rule. The request may be from user 102A utilizing a computing device 104 (for example, client 106 implemented by a computing device 104 outside the provider network 100, e.g., as part of an application installed on a personal computer or server computing device or as part of a web-based console provided by the provider network 100) to send one or more messages (e.g., API call(s)) to the provider network 100 to request the review of source code. The frontend service 114 in an embodiment of this example sends a message at circle "2" to cause metadata service 116 to create an inference workflow for that source code. The job orchestrator 118 in an embodiment of this example sends a message at circle "3" is to poll (e.g., sweep) the metadata service 116 for pending onboarding and inference tasks. If a pending task is an onboarding task, metadata service 116 in an embodiment of this example sends a message at circle "4" to cause onboarding service 152 to configure (at circle "6") the onboarding of the source code (e.g., via event router service(s) 146 as discussed herein). In one embodiment of this example, onboarding service 152 is to send a message at circle "5" to indicate to metadata service 116 that the onboarding is complete. In one embodiment, after the source code has been onboarded (e.g., including monitoring of the source code (e.g., repository 144) for an event to trigger a code review), a triggering event (e.g., a pull request or a user's explicit request) causes a corresponding message to be sent to event router services 146. In certain embodiments, a triggering event is a user 102B causing at circle "7A" a change detected by source (e.g., version) control service 142. In certain embodiments, a triggering event is a user causing at circle "7B" a change detected by webhook service 150. In one embodiment of this example, event handler 120 receives in event queue(s) 122 a message from event router services 146 for a monitored event and on-demand function 124 detects this message at circle "8". The event handler 120 (e.g., on-demand function 124 set-up to perform this action) in an embodiment of this example sends a message at circle "9" to cause metadata service 116 to create a job for this inference request (e.g., the code is to be reviewed now). The inference service 126 in an embodiment of this example detects the job and begins the inference request. As discussed above, the job orchestrator 118 in an embodiment of this example sends a message at circle "3" is to poll (e.g., sweep) the metadata service 116 for pending onboarding and inference tasks. In one embodiment of this example, on detection of an inference task (e.g., job), job orchestrator 118 sends a message at circle "10" to inference service 126 (e.g., to workflow service 200 discussed in reference to FIG. 2) to trigger an inference workflow. In certain embodiments, the inference service 126 performs one or more internal API calls to metadata service 116 at circle "11" to cause the inference job to be performed. The inference service 126 in an embodiment of this example sends (or causing the sending of) a message at circle "12" to access the source code that is to be reviewed. After the inference service 126 (e.g., code recommendation service 130) performs its review, it generates one or more recommendations 138 for the source code at circle "13" in certain embodiments. In one embodiment, the recommendation(s) 138 are sent to the code repository 144 at circle "14", e.g., for posting on a pull request. In one embodiment, a user performs an API call via frontend service 114 to access the recommendation(s) 138. In one embodiment, recommendation(s) 138 (e.g., results) may include an indication of "no recommendations" (e.g., because no predicted issues were identified) and/or a "success" or "failure" indication (e.g., indicating success and failure, respectively, of the inference job) for rules 134. In some embodiments, for custom-rules 136 the result includes an indication of one or more of: whether rule evaluation was successful; whether evaluation of one or more preconditions was successful; a last match result; a last non-empty match result (which is useful if rule evaluation failed, and so the last match result is empty); and/or a last operation evaluated (which is useful if rule evaluation failed to localize the failure point). Note that a "pull request" may include a custom rule.

Metrics may be monitored (e.g., collected) by metric monitoring service 140 at circle "15".

Code reviewer service 112 may also train one or more machine learning models 132 for use by code recommendation service in generating predicted issues and/or recommendations based on those predicted issues in some embodiments.

In certain embodiments, a pull request is the primary way for repository users to review, comment on, and merge code changes from one branch to another. For example, a user can pull requests to collaboratively review code changes for minor changes or fixes, major feature additions, or new versions of released software. The following is one possible workflow for a pull request:

A developer working in a repository named Repo, wants to work on a new feature for an upcoming version of a product. To keep their work separate from production-ready code, the developer creates a branch off of the default branch and names it Feature. The developer writes code, makes commits, and pushes the new Feature code into this branch. If the developer wants other repository users to review the code for quality before the developer merges the changes into the default branch. To do this, the developer creates a pull request, e.g., with all of this occurring separately from code reviewer service 112 in FIG. 1. In one embodiment, the pull request contains the comparison between the working branch and the branch of the code where the developer intends to merge their changes (in this case, the default branch). The developer can also create an approval rule that requires a specified number of users to approve the pull request. The developer can specify an approval pool of users. Thus, other users can review the developer's code and changes, adding comments and suggestions. The developer might update their working branch multiple times with code changes in response to comments. The changes are incorporated into the pull request every time the developer pushes them to that branch, e.g., using source (e.g., version) control service 142. The developer may incorporate changes that have been made in the intended destination branch while the pull request is open, so users can be sure they are reviewing all of the proposed changes in context. When the developer and the reviewers are satisfied, and the conditions for approval rules (e.g., if any) have been satisfied, the developer (or one of the reviewers) merges the code and closes the pull request.

Figure 2:
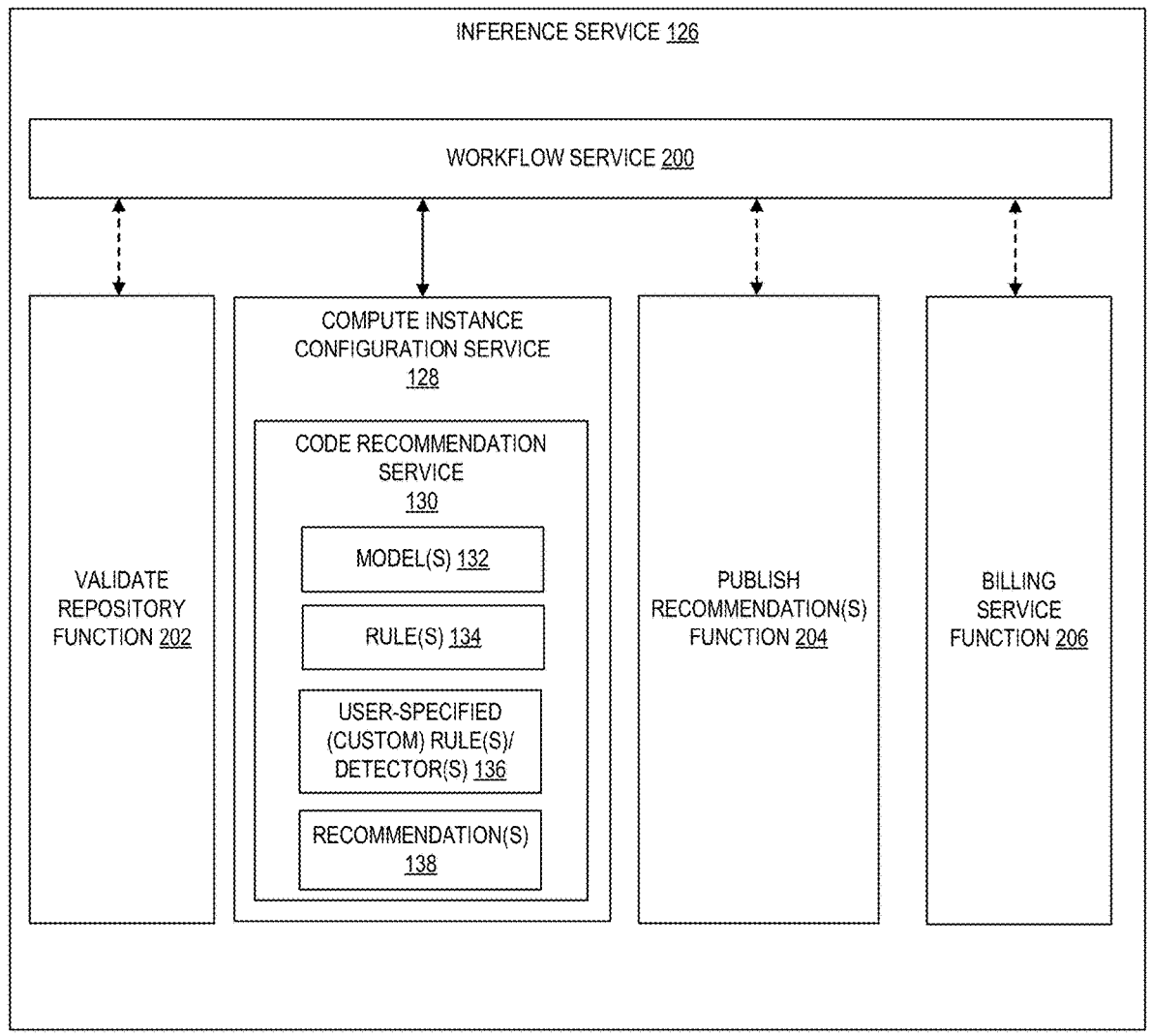
FIG. 2 is a diagram illustrating an inference service according to some embodiments.

FIG. 2 is a diagram illustrating an inference service 126 according to some embodiments. Inference service 126 may run one or more rules 134 and/or one or more machine learning models 132 to produce recommendations on a customer's source code. In certain embodiments, (e.g., multi-tenant) inference service 126 interacts with other components of code reviewer service 112, including, but not limited to, event handler(s) 120, metadata service 116, and job orchestrator 118 to fetch an inference job and run it securely and at scale in a sand-boxed environment (e.g., as managed by compute instance configuration service 128). In certain embodiments, inference service 126 provides recommendations 138 for specific source code (e.g., less than the entire repository) that helps to improve the code quality of specific source code, recommendations 138 for a given repository 144 that helps to improve the code quality of the entire repository, is multi-tenant and handles customer's code repositories securely, is capable of running rules 134 (and/or user-defined rules 136) and integrating with machine learning models to provide recommendations on multiple categories (e.g., concurrency, best practices, etc.), is scalable to (e.g., concurrently) run multiple jobs (e.g., either for an entire repository or for a proper subset of files within a repository) asynchronously (e.g., within a certain time threshold for completion), or any combination(s) thereof.

As two non-limiting examples, a customer can get code recommendations from code recommendation service 130 on a repository (1) as a Pull Request inference where a customer onboards a given repository so that the code recommendation service 130 posts recommendations 138 on every pull request on that repository and/or (2) as an On-Demand inference where a customer uses a create recommendation job API to trigger inference on the entire code repository. In one embodiment, this API call results in an asynchronous job with a job ID that fetches the repository and runs inference on it. In one embodiment, once the job finishes, the customer can view code recommendations generated by the job in a console or by calling a list recommendations API that includes the job ID. In one embodiment, a customer can use On-Demand inference before (and after) onboarding the code repository as a source for code recommendation service 130. In certain embodiments, recommendations for both types of inferences (1) and (2) are generated via the same inference system asynchronously.

Inference service 126 in FIG. 2 includes a validate repository function 202 to validate that the repository is the correct repository for the inference request. Inference service 126 in FIG. 2 includes a publish recommendation(s) function 204 that publishes the recommendation(s) 138 for a user, e.g., publishes them back to the repository (e.g., on a pull request of the repository). Inference service 126 in FIG. 2 includes a billing service function 206 that tracks the resource utilization for an (e.g., each) inference request, e.g., and causes an invoice to be sent based on that utilization.

Figure 3:
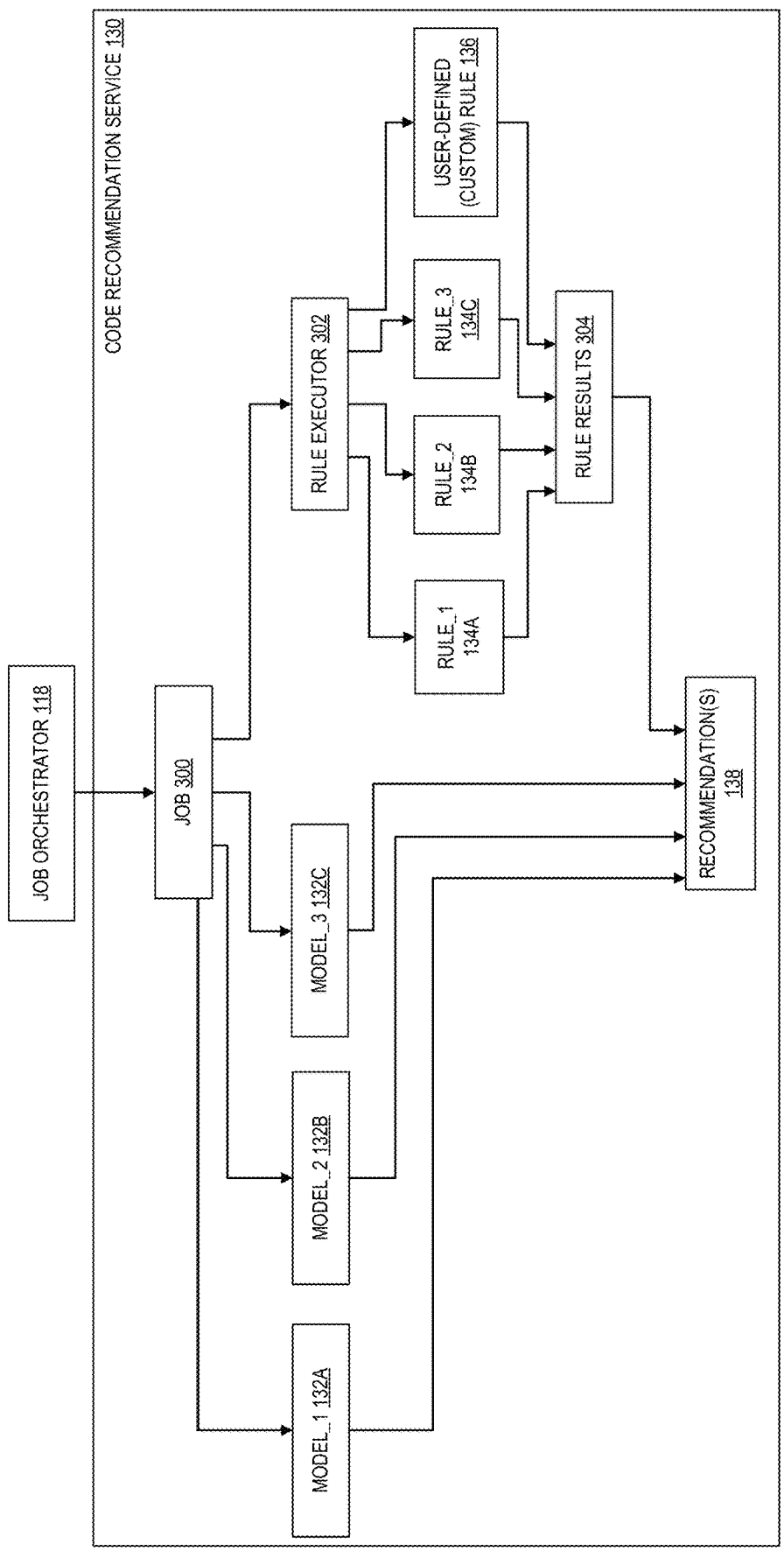
FIG. 3 is a diagram illustrating a code recommendation service according to some embodiments.

FIG. 3 is a diagram illustrating a code recommendation service 130 according to some embodiments. This section will provide details about types of rules. Rules can be categorized in multiple ways. One way is to categorize rules by the different data types that may be utilized. For example, (1) Source code based rules (e.g., that use source code as a input), (2) control flow and data flow graph based rules (e.g., using a graph derived from source code) (e.g., a MUgraph), and (3) Abstract syntax tree (AST) based rules (e.g., using AST extraction from source code).

Different rules can require different context to evaluate code and make suggestions: (1) rules that only need changed file as context (e.g., that use changed files only), (2) rules that need all source code files in current package source folder as context, (3) rules that use all files of defined type in current package as context, (4) rules that use an entire package as context including test folder, or (5) rules that use all downstream dependencies as context.

Certain embodiments herein take both data types and context into consideration, and weigh in current implementation to categorize rules. (1) Regular expression (regex) based rules that (e.g., only) use changed file as context. This rule may apply a list of specified regex expressions to source code, and return corresponding comment and line number if there is any matching. In certain embodiments, it does not require any feature extraction or any additional context, and can be applied to changed file source code directly. (2) Graph based rules that use pre-processing to extract the graph from source code and (i) with changed files as context, (ii) with all source files from current package as context, or (iii) with all files from current package as context. (3) Domain-specific Language (DSL) based rules that have following statements: rule setup, precondition, postcondition, and/or actual check. Rules fitting here is to have a defined sequence of actions. It can be a combination of function calls as a sequence of statements. It can also be nested functions or chained methods. Rules will be applied to source code file: (i) with changed files as context, (ii) with all source files from current package as context, or (iii) with all files from current package as context. (4) Other data type based rules that use a preprocessing of feature extraction. Depending on the model type used, preprocessing may then perform feature extraction on source code and pass required model to execution step. Same data type can share the same feature extraction process. Data types can be AST or other.

Code recommendation service 130 includes a rule executor 302 that allows for (i) rule orders (e.g., that supports labeling the executing order of rules). A rule can be a condition for other rules. For example, rule1 and rule2 can all wait for rule3 to finish before starting. A conditional rule can be defined using this priority and determine rule execution. Code recommendation service can build on top of this to make more complicated sequences if needed. (ii) Composite rules that allows for the creation of composite rules from primitive ones (e.g., grouping multiple rules). A composite rule can be created as a parent rule that have multiple children rules. If all conditions are satisfied or from different rules, a different action can be executed. Rules can be grouped in the same category to emit metric together, or used to divide rules running in different threads, or use to apply complicated regex, or graph using different conditions. (iii) Activation Rule Group supports grouping multiple rules and only uses (e.g., fires) the first rule that meets the condition. This can be used for a set of rules, when all their conditions are satisfied, yet a user only wants to generate a comment from one of the rules. (iv) Custom Rule Engine offers the flexibility to run customize rule engine. (v) Rule Engine Parameters allows for rules to be handled in different ways. For example, it can skip following rules when a rule is applied, it can skip following when there is a rule that fails, it can skip following rules if a rule is not triggered, and/or it can skip following rule when priority exceeds certain threshold. In some embodiments, the rule executor 302 is an interpreter of the queries of a rule into actions to be performed.

The below discusses a rule interface design. The term "facts" may refer to a set of known inputs at the time of firing rules, e.g., holding a HashMap<String, Object>. Each fact may have a unique name. Any object can act as a fact.

(1) If the input that inference is to be performed on is source code, can (a) pass as a list of file paths or (b) iterate file path list and read source code to memory that inference is to be performed on.

(2) Some rules may use extracted features that are derived from source code. When a new rule category gets introduced with new extracted feature model type, it may define a new fact type.

Feature extracting may be performed (a) prior to firing any rule (e.g., when initializing facts and reading in source code files, extract all type of features needed for upcoming rules or (b) make feature extraction a prerequisite rule of rules that requires derived features.

(3) Rule result(s) may be stored for each recommendation that a rule generates. In one embodiment, the rule result has a list of rule findings that contains following variables: file path, startLine, endLine, comment, rule name, confidence score, priority (when there are too many findings on same file, use priority to filter finding before surfacing to customer), or any combination(s) thereof.

In FIG. 3, job 300 may include an indication of various models (132A-132C) and rules (134A-134C and/or 136). The number of rules and models shown is merely an example, and any single rule, plurality of rules, single model, or plurality of models may be used. Rule results 304 may thus include a result from one rule or more than one rule. In certain embodiments, code recommendation service uses the outputs from the model(s) and/or rule(s) to generate recommendations 138.

Referring again to FIG. 3, certain rules are executed by rule executor 302 with the flow including: (1) registering with the code recommendation service 130 the rule(s) to be executed for a particular job 300, (2) creating the inputs (e.g., "facts" such that (i) fact builder reads the input file path and loads source code, (ii) the fact builder optionally perform feature extraction and store it (e.g., to facts map), and (iii) initializing a field to store rule detection result (e.g., rule results 304), (3) applying (e.g., firing) rules (e.g., including a user-defined configurations of running rules) and in one embodiment, if multiple rules are fired and one rule fails due to unexpected exception, it will not affect other rules that are running in parallel, e.g., it will only affect the rules that have a chain dependency on this failed rule, such as prerequisite rule or composite rule, (4) collect results, and (5) filtering results (e.g., to eliminate duplicate findings (too many same suggestions for same file), similar findings (different rules generating similar recommendations), overlapping findings (too many suggestions on the same line), etc. The filter(s) can be based on rule finding priority, confidence score, and/or a customized value each rule defines.

Metrics (e.g., generated by metric monitoring service 140 may include any one or combination of: (1) availability metrics (e.g., bad request count (Error), modeled exceptions count (Fault), and/or runtime or not modeled exceptions count (Failure)), (2) rule specific metrics (e.g., number of findings per rule per request, number of findings for all rules per request, number of requests that have zero findings of individual rule, number of requests that have zero findings of all rules, number of rules fired successfully per request, and/or number of rules fired failed per request), (3) traffic metrics (e.g., total file size for each request and/or if a rule has an execution condition, the number of requests that pass the execution condition check and are executed), (4) duration metrics (e.g., duration to execute each rule and get findings per request, duration to read in files per request, and/or duration to extract features per request) and/or (5) alarms (e.g., spike in bad request count and/or runtime exception failure count exceeding a threshold value for a time period).

Views on coding best practices, as well as what it means to enforce code hygiene and quality, may vary vastly across teams and organizations. The ability to extend and customize inference service 126 can help customers adapt it to suit better their needs.

Rules workbench enables users to define custom rules (e.g., and detectors). In certain embodiments, users can use one of three modes to define rules: (1) use the guided workflow to come up with a rule definition and validate against sample code, (2) start with sample code and ask code reviewer service to recommend rule(s), refine these rules, and validate against sample code, and (3) implement a supported interface for a user to build a custom implementation of a rule and host it on compute environment of their choice. In certain embodiments, the inference service 126 supports the ability for customers to share an endpoint to a custom detector (e.g., hosted by the customer) so that they can be run as part of a base set of rules and/or models.

In certain embodiments, a detector is implemented as machine learning model(s) or rule(s). In certain embodiments, the inference service 126 supports running detectors at method, file, or the entire project context allowing for the design and implementation of various types of rules/detectors. In certain embodiments, the inference service 126 supports various interfaces so that rules can be written to work directly on the source code in text form or on extracted features. For each inference job, in certain embodiments the inference service 126 may run (e.g., in addition to non-user defined rules of the inference service 126) user defined rules and/or (e.g., user-hosted) detectors to provide recommendations on code. In one embodiment, the inference service 126 reports metrics (e.g., to metrics monitoring service 140) for all rules/detectors it runs that can be used by users to customize and adapt their rules/the code recommendation service 130.

The custom rules 136 detailed herein are typically applied at the method level, where the method-level graph representation captures control and data flow. However, interprocedural matching is also supported. The custom rules support analysis beginning at any node in a graph. The analysis may be forward data flow analysis, a backward data flow analysis, a combination of forward and backward, across methods, and/or may incorporate custom functionality (e.g., functionality not provided by the operations detailed herein).

A custom rule represents a sequence of operations. In some embodiments, a rule consists of a plurality of sections. For example, a rule may consist of one or more of: a prefix, precondition, and postcondition. The prefix specifies the name of the rule and may also include a message to be shown for when a rule evaluation fails. In addition, the prefix can optionally include a filter constraining the methods to which the rule is applied. The precondition specifies the rule's applicability to a given method. The postcondition expresses a check to be performed. Its evaluation is contingent on the precondition being satisfied.

An operation executes a step in the query, and thus transforms the input match result into an output match result. A match result is the set of graph nodes matching the current step in a query (or rule). In the initial state, before query evaluation begins, the match result contains all graph nodes.

The evaluation of a rule yields a result consisting of one or more aspects. In some embodiments, the result includes an indication of one or more of: whether rule evaluation was successful; whether evaluation of one or more preconditions was successful; a last match result; a last non-empty match result (which is useful if rule evaluation failed, and so the last match result is empty); and/or a last operation evaluated (which is useful if rule evaluation failed to localize the failure point).

As an example, consider a simple example of a library L with two APIs (run and checkResult) where the practice to enforce is that a call to run is followed by a call to checkResult on its return value. That would translate into the following rule structure:
Precondition: Check whether there is a call to run.
Postcondition: Collect the return values of all run calls into a match result M.
   For all data nodes in M, check that they flow into a checkResult call.

The semantics of rule evaluation follows the logical rule of inference such that when a precondition section yields an empty match result M (that is in this example, no run calls are found), then rule evaluation (vacuously) succeeds.

If the precondition yields a non-empty match result M (which, assuming universal quantification, means that all calls flow into calls), then rule evaluation succeeds if and only if the postcondition yields a non-empty match result.

Note that when transitioning from precondition to postcondition, the match result is reset. That is, the starting point for both precondition and postcondition is all graph nodes.

Examples of categories of operations include, but are not limited, to one or more of: core operations, filter operations, transformer operations, and higher-order operations.

Core operations may include, but are not limited to: 1) a check operation, which separates a rule's precondition from its postcondition, and in the process, resets the match result; 2) "as" and "with-id" operations which perform storing and loading of intermediate match results, respectively; 3) an instrumentation operation which enables interleaving a function into the rule, at any point, to record information of interest regarding the match result (not the function is expected not to alter the match result); and/or 4) a thresholding operation that allows for limiting of the number of elements in the match result.

A filter operation is parameterized by (i) a predicate p (ii) a quantifier (ALL or ANY). It iterates through the input match result M. In the case of ALL, it returns M if all elements of M model p, or else it returns the empty match result. In the case of ANY, it returns the elements of M that model p.

Unlike a filter, which returns a subset of the input match result, a transformer operation returns a match result that potentially contains new elements. As an example, the then transformer operation returns all the nodes in the graph that occur after nodes in the match result per the graph's control flow edges.

A higher-order operation is an operation that nests within it one or more subrules. As an example, the query language allows the expression of (unbounded) disjunction via the one-of operation. In this case, each branch is modeled as a subrule.

Beyond the operations themselves, which comprise matching matches that target the method's body, the query language may also expose filters on the methods themselves. For example, the user may wish to skip checking of all methods that are not Coral operations. Matching at the method level is done via method matchers, which can be specified as part of the rule's prefix (that is, before the operations).

Custom rules allow for an interleave between a backward analysis and forward analysis based on user-specified conditions (start and stop nodes for example), an analysis between sub-graphs by a query from a first sub-graph to a second-sub-graph of a graph, the storage from an analysis on a sub-graph that is used in the analysis of a different sub-graph, in conjunction with analysis of a different sub-graph, etc.

FIGS. 4-6 illustrate exemplary API calls for the various operations and what action the API call causes. FIG. 4 illustrates exemplary method matches and core operations according to some embodiments. FIG. 5 illustrates exemplary filter predications according to some embodiments. FIG. 6 illustrates exemplary transformer operations and higher-order operations according to some embodiments.

In some embodiments, evaluation using a rule is implemented on a graph representation of the code to be evaluated. In some embodiments, custom rules are at the granularity of methods that may be related to each other (e.g., at the file, package, or system level) via a call-graph representation.

FIG. 4. Illustrates an example of a graph representation of code. This representation is from the code snippet of:

```
Map<String, String> gfg = new HashMap<String, String>( );
For (string name : gfg.keySet( )) {
      System.out.println("Value: " + gfg.get(name)):
}
```

A rule having a precondition that keyset is invoked on a Map object and get is invoked on the same object in the flow. The remaining check is whether the keys due to the keyset reach the get call through a local data flow. If so, then an anti-pattern is likely present and the rule evaluation fails.

Figure 7:
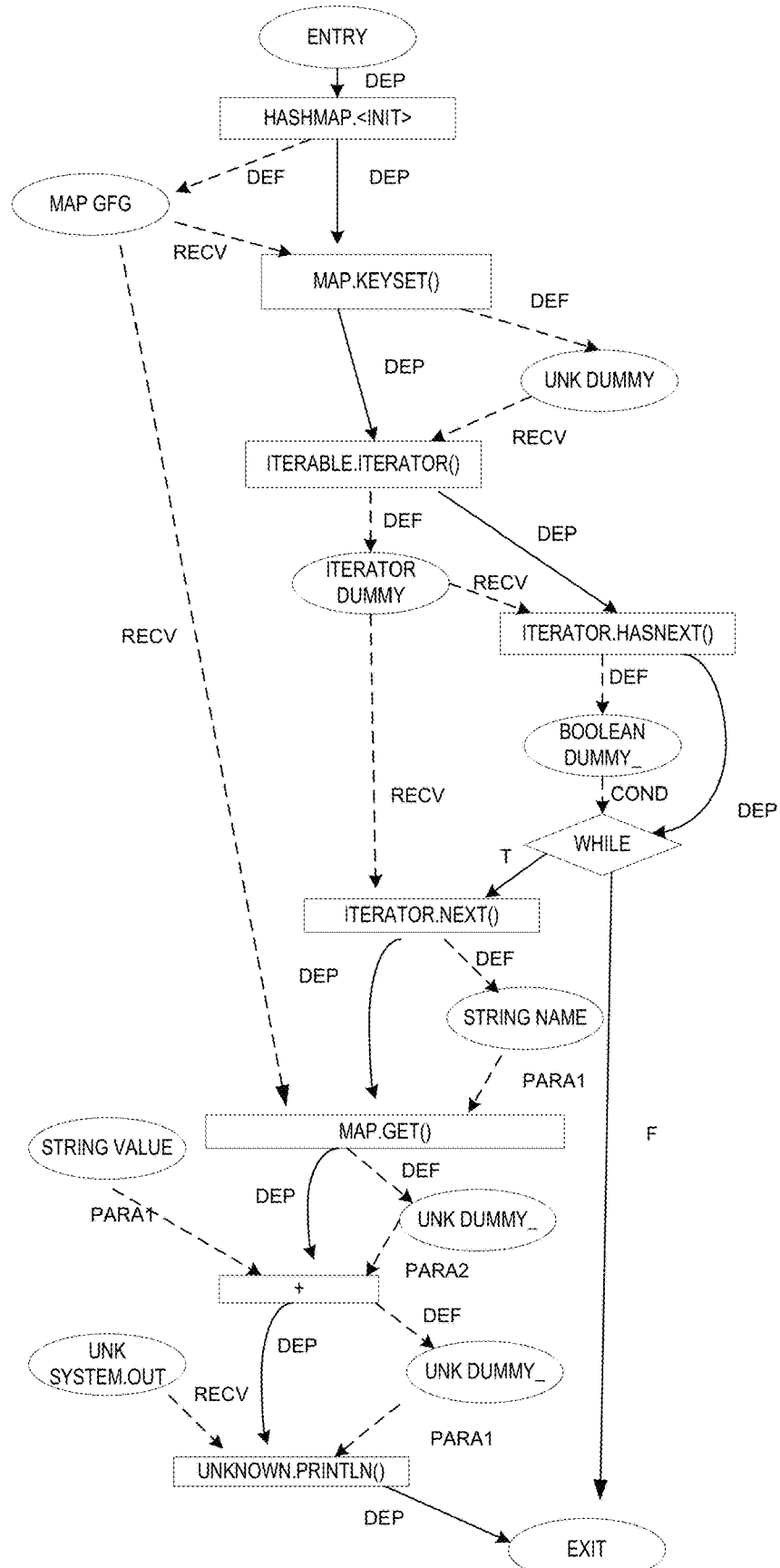
FIG. 7 illustrates an exemplary graph.

An exemplary rule to evaluate the code snippet is:
new CustomRule.Builder( )
   .withName(RULE_NAME)
   .withComment(Comment)
   withMethodCall("keySet")
   .withReceiverByType("Map")
   .as("key SetCall")
   .withReceiverTransform( )
   .as("receiver")
   .then( )
   .withMethodCall("get")
   withContext(ContextKind.LOOP)
   .withReceiverID("receiver")
   .as("getCallOnMapInLoop")
   .check( )
   .withID("getCallOnMapInLoop")
   .withoutIntraproceduralDataFromID("keySetCall")
   .build( );

The rule is explained below. When going through its steps, the graph of FIG. 7 is cited to illustrate node matching. Nodes are pointed to using their text label, where the label is enclosed in square brackets ([ ]) for action nodes (square in the visual graph) and parentheses (( )) for data nodes (ellipsis in the visual graph).

The rule starts with a standard prefix that specifies the rule's name and comment (lines 1 and 2). A filter predicate is introduced in line 3 which is to cause a search for "keySet" calls whose receiver has type "Map" (line 4).

The .as operation of line 5 causes a store of the current match results (matching graph nodes) (["Map.keySet( )"]) under the id of "keySetCall". A transform from the call nodes to their respective receiver nodes is made at line 6.

The .as operation of line 7 is to cause a store of the matching graph nodes (("Map gfg")) under the id "receiver".

A transform from the matching graph nodes to the downstream nodes in the graph is made at line 8.

A search for "get" calls in a loop with receivers in common with the "key Set" calls occurs in lines 9-11. The matching graph nodes (["Map.get( )" ]) are stored under id "getCallOnMapInLoop" in line 12.

A switch to a check is made at line 13.

The graph nodes corresponding to the matching "get" calls are loaded in line 14.

Finally, a check to ensure that there is no local data flow from the "keySet" calls to the "get" calls is made at line 15.

Figure 8:
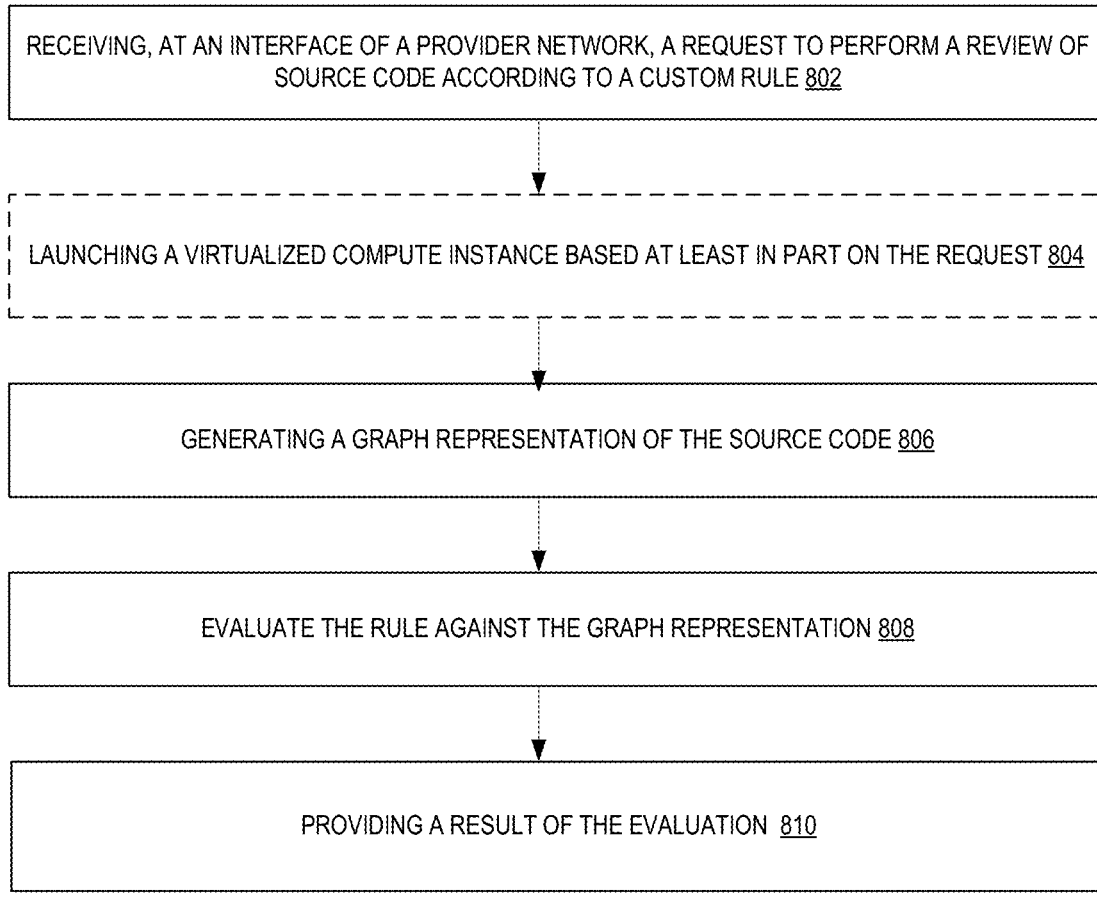
FIG. 8 is a flow diagram illustrating operations of a method for applying a custom rule using a code review service according to some embodiments.

FIG. 8 is a flow diagram illustrating operations of a method for applying a custom rule using a code review service according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the code reviewer service 112 of the other figures.

At 802, a request to perform a review of source code according to a rule is received. The request may include, for example, the rule, an identifier of a location of the rule, the source code, an identifier of a location of the source code, etc. As noted above, custom rule supports analysis beginning at any node in a graph. The analysis may be forward data flow analysis, a backward data flow analysis, a combination of forward and backward, across methods, and/or may incorporate custom functionality (e.g. functionality no provided by the operations detailed herein). A rule includes one or more operations including a precondition and postcondition. A rule typically also includes one or more of rule identifier such as a prefix or postfix.

A virtualized compute instance based at least in part on the request is launched at 804. This virtualized compute instance will perform the inference of the evaluation of the source code according to the rule.

At 806, a graph representation of the source code is generated. In some embodiments, an abstract syntax tree (AST) is generated and then a graph (such as a MUgraph) is generated from the AST.

Figure 9:
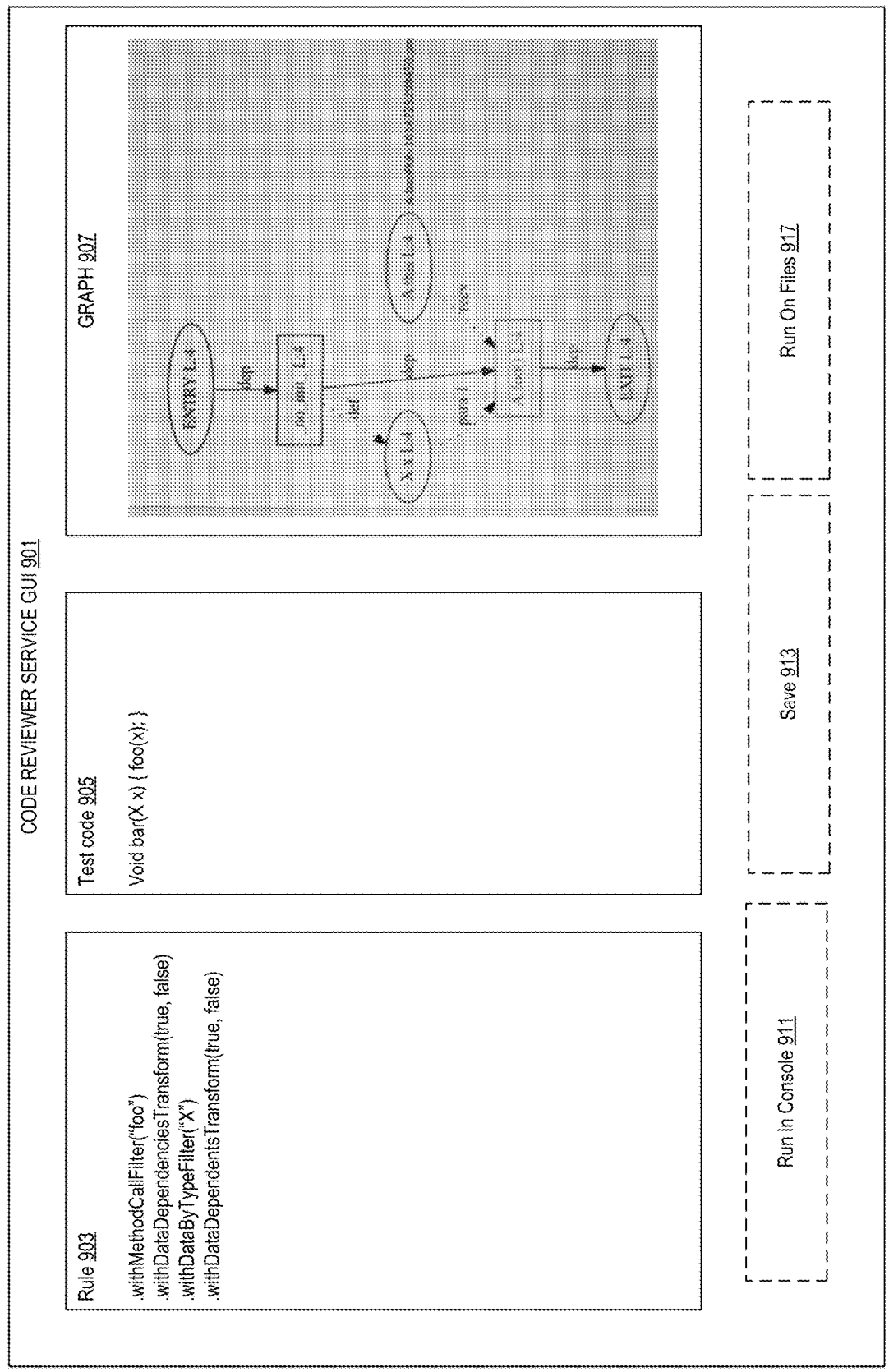
FIG. 9 illustrates a graphical user interface (GUI) for a code reviewer service (using custom rules).

FIG. 9 illustrates a graphical user interface (GUI) for a code reviewer service (using custom rules). As shown, the GUI 901 includes components for editing a rule in rule editing component 903, inputting and/or displaying test code in test code component 905, and showing a graph of the text code in the graph component 907. The graph can be generated in real time (as test code is entered), from a file (called by a run on files function 917), or based on a command (such as run in console 911), depending on the embodiments.

In some embodiments, the depiction of the graph highlights potential operation violations (e.g., by color, bounding box, etc.). In some embodiments, different operation violations are highlighted differently (e.g., different colors). In some embodiments, hovering over or selecting an operation will cause its impact on the graph to be shown in the graph (e.g., hovering over an operation will cause the graph display to be updated if there is a violation).

Note that results of the analysis, the analysis setup, the rule, etc. can be saved using a save function 913.

Figure 10:
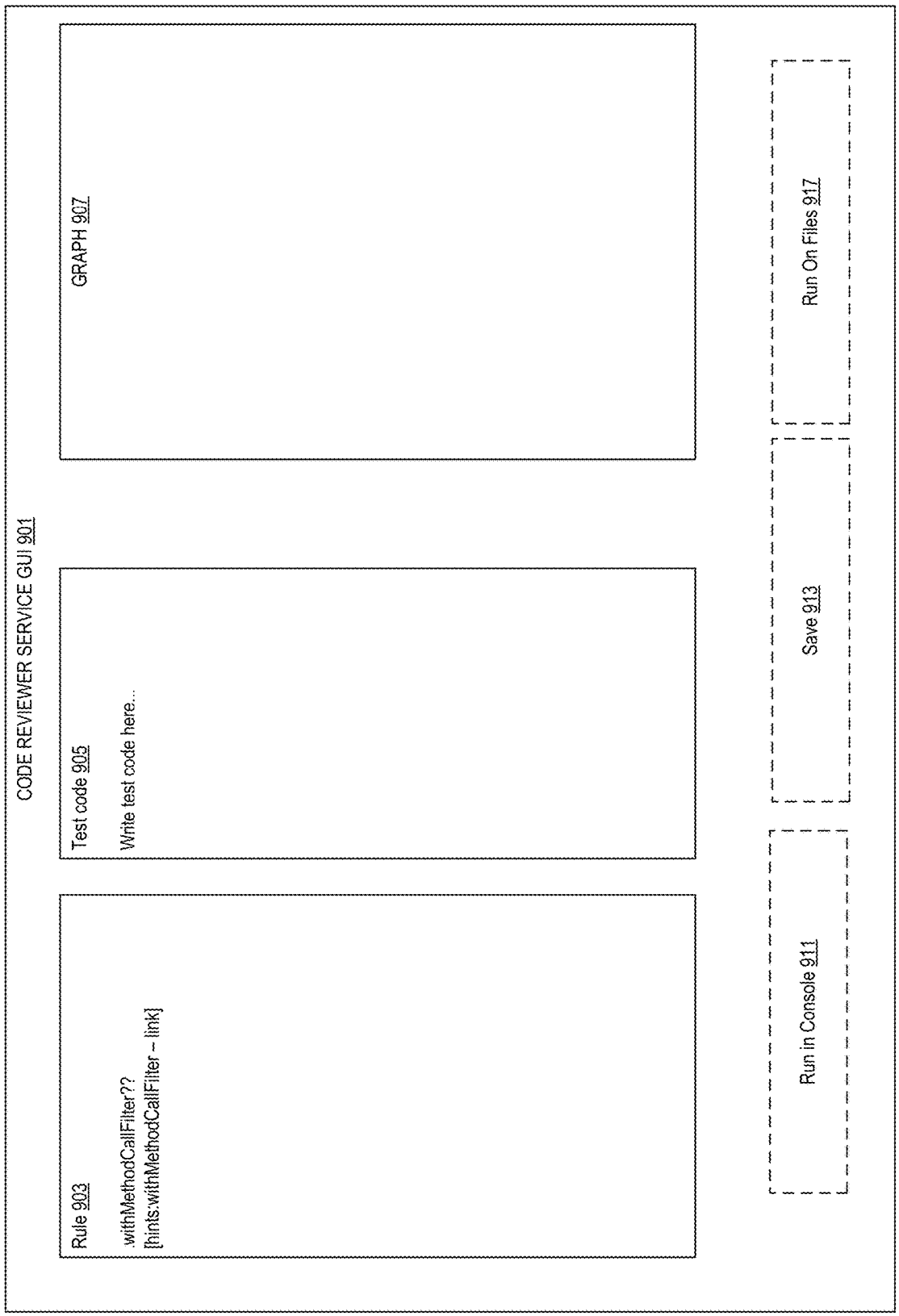
FIG. 10 illustrates a graphical user interface (GUI) for a code reviewer service (using custom rules).

FIG. 10 illustrates a graphical user interface (GUI) for a code reviewer service (using custom rules). This GUI 901 is the same as FIG. 9. What is highlighted here is that in some embodiments a user can ask a question (shown here by using ??) about a particular operation. A link to a hint about its use is provided in the rule editing component 903.

The rule is evaluated against the graph representation at 808. The analysis may be forward data flow analysis, a backward data flow analysis, a combination of forward and backward, across methods, and/or may incorporate custom functionality (e.g., functionality not provided by the operations detailed herein) from any given node, Backward analysis tracks data to its origin(s), and forward analysis tracks data to its destination(s). Interleaving these two forms of analysis yields powerful reasoning capabilities, for example in tracking untrusted data into an operation, then tracking back from the operation to its receiver to check whether it is sensitive. Custom logic can also be spliced into the backward and/or forward analysis. For example, mapping the tracked data at a given reasoning step to other data or filtering the tracked data.

One or more results of the evaluation are presented to a user at 810.

Figure 11:
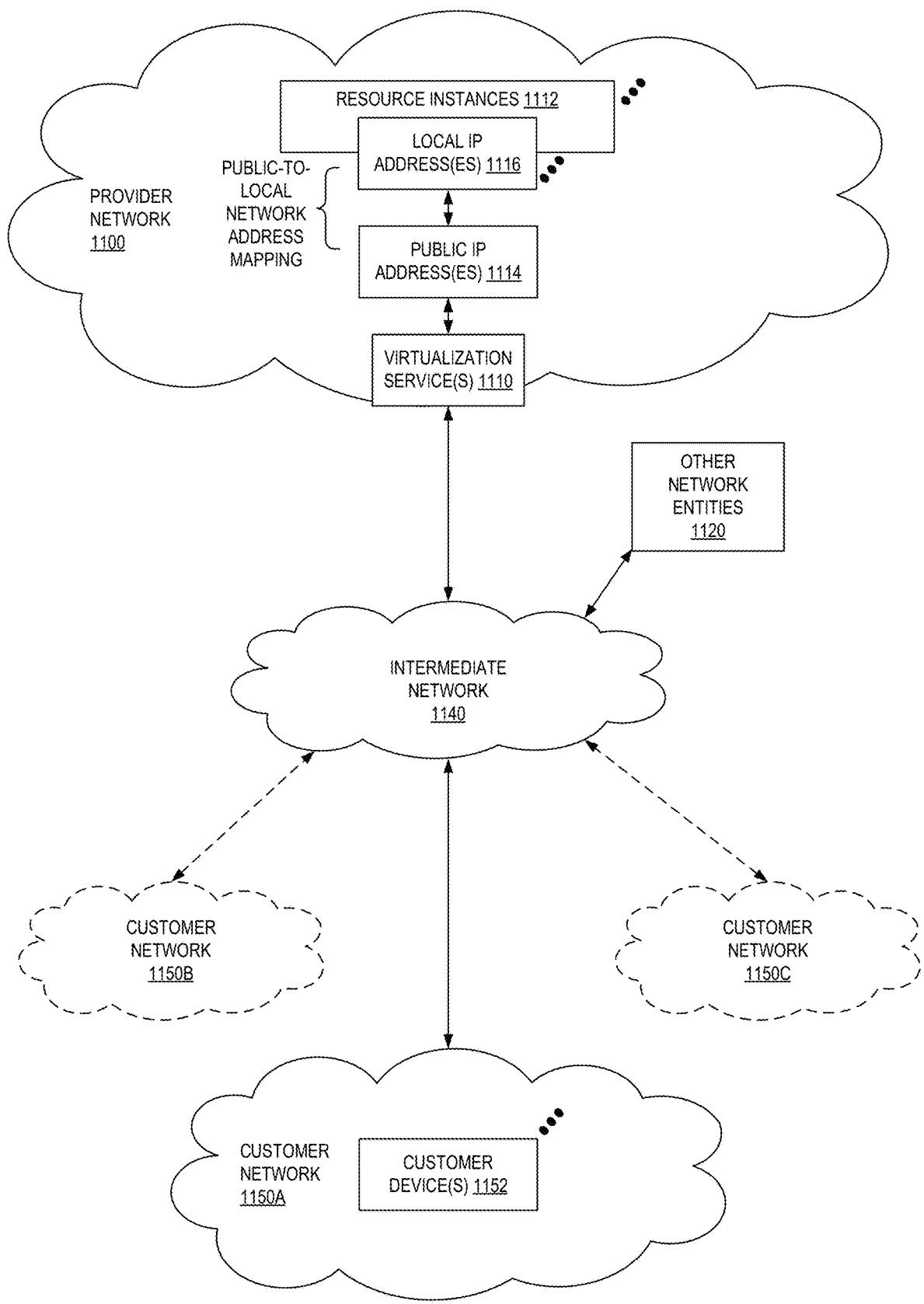
FIG. 11 illustrates an example provider network environment according to some embodiments.

FIG. 11 illustrates an example provider network (or "service provider system") environment according to some embodiments. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
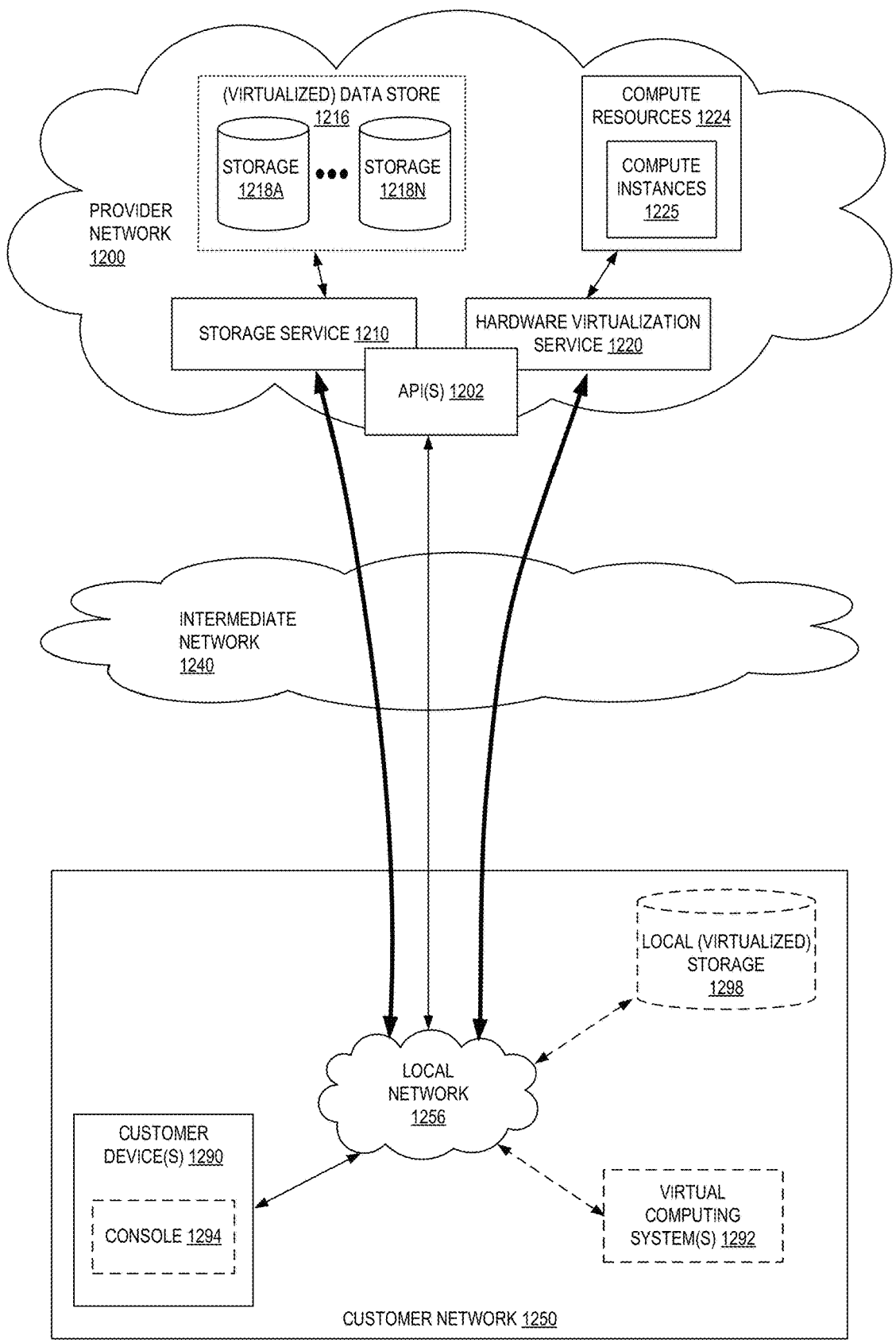
FIG. 12 is a block diagram of an example provider network that provides a storage service and a hardware virtualization service to customers according to some embodiments.

FIG. 12 is a block diagram of an example provider network that provides a storage service and a hardware virtualization service to customers, according to some embodiments. Hardware virtualization service 1220 provides multiple compute resources 1224 (e.g., compute instances 1225 such as VMs) to customers. The compute resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the compute resources 1224 to public Internet destinations, and from public Internet sources to the local IP addresses of compute resources 1224.

Provider network 1200 may provide a customer network 1250, for example coupled to intermediate network 1240 via local network 1256, the ability to implement virtual computing systems 1292 via hardware virtualization service 1220 coupled to intermediate network 1240 and to provider network 1200. In some embodiments, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some embodiments, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage service 1210, for example via one or more APIs 1202, to access data from and store data to storage resources 1218A-1218N of a virtual data store 1216 (e.g., a folder or "bucket", a virtualized volume, a database, etc.) provided by the provider network 1200. In some embodiments, a virtualized data store gateway (not shown) may be provided at the customer network 1250 that may locally cache at least some data, for example frequently accessed or critical data, and that may communicate with storage service 1210 via one or more communications channels to upload new or modified data from a local cache so that the primary store of data (virtualized data store 1216) is maintained. In some embodiments, a user, via a virtual computing system 1292 and/or on another customer device 1290, may mount and access virtual data store 1216 volumes via storage service 1210 acting as a storage virtualization service, and these volumes may appear to the user as local (virtualized) storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Illustrative Systems

Figure 13:
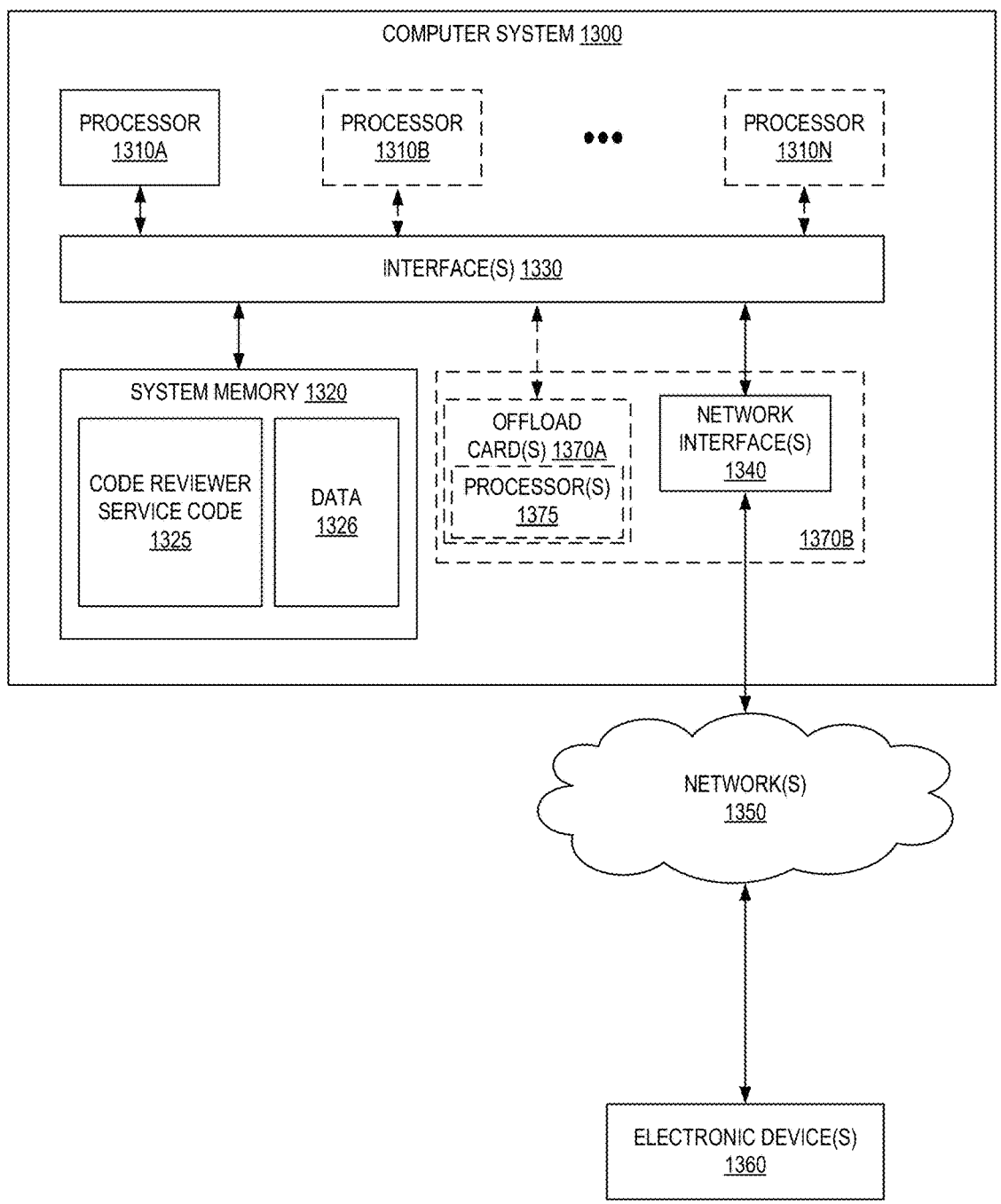
FIG. 13 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various embodiments a computer system 1300 may include one computing device or any number of computing devices configured to work together as a single computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various embodiments, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1320 as code reviewer service code 1325 (e.g., executable to implement, in whole or in part, the code reviewer service 100) and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG. 1, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1300 includes one or more offload cards 1370A or 1370B (including one or more processors 1375, and possibly including the one or more network interfaces 1340) that are connected using an I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some embodiments the offload card(s) 1370A or 1370B can perform compute instance management operations such as pausing and/or un-pausing compute instances, launching and/or terminating compute instances, performing memory transfer/copying operations, etc. These management operations may, in some embodiments, be performed by the offload card(s) 1370A or 1370B in coordination with a hypervisor (e.g., upon a request from a hypervisor) that is executed by the other processors 1310A-1310N of the computer system 1300. However, in some embodiments the virtualization manager implemented by the offload card(s) 1370A or 1370B can accommodate requests from other entities (e.g., from compute instances themselves), and may not coordinate with (or service) any separate hypervisor.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to perform data flow tracking on identified code based on a customized rule comprising a first section to at least identify the customized rule, one or more preconditions to define conditions for which the customized rule is applicable, and one or more postconditions to indicate at least one check to perform, wherein the one or more preconditions and one or more postconditions are called by application programming interface (API) calls, wherein an application of the customized rule performs one or more of:
   an interleave between a backward analysis and forward analysis based on user-specified conditions,
   an analysis between sub-graphs by a query from a first sub-graph to a second sub-graph, and
   an operation on a sub-graph, storage of a result of the operation on the sub-graph, and usage of the stored result in a subsequent operation;
   generating a data flow graph for the identified code;
   performing the data flow tracking on the identified code by applying the customized rule to the generated data flow graph; and
   providing a result of the data flow tracking to a user.

2. The computer-implemented method of claim 1, wherein the result comprises one or more of:
   a determination of a successful rule evaluation;
   a determination of whether a precondition evaluation was successful;
   a last match result;
   a last non-empty match result; and
   an indication of a last operation evaluated, wherein a match result is a set of graph nodes matching a current step in the customized rule.

3. The computer-implemented method of claim 1, wherein the data flow tracking comprises a forward data flow analysis in the data flow graph from a given node of the data flow graph.

4. A computer-implemented method comprising:
   receiving a request to evaluate code based on a customized rule, the customized rule comprising one or more conditions for which the customized rule is applicable and one or more postconditions to indicate at least one check to perform for a given node in a graph for the code, wherein an application of the customized rule performs one or more of:
   an interleave between a backward analysis and forward analysis based on user-specified conditions,
   an analysis between sub-graphs by a query from a first sub-graph to a second sub-graph, and
   an operation on a sub-graph, storage of a result of the operation on the sub-graph, and usage of the stored result in a subsequent operation;
   generating the graph for the code; and
   evaluating the code by applying the customized rule to the generated graph.

5. The computer-implemented method of claim 4, wherein the customized rule includes a name for the customized rule and a message to be shown when evaluation of the code by applying the customized rule fails.

6. The computer-implemented method of claim 4, wherein an output of the evaluating the graph on the code by applying the customized rule comprises one or more of:
   a determination of a successful rule evaluation;
   a determination of whether a precondition evaluation was successful;
   a last match result;
   a last non-empty match result; and
   an indication of a last operation evaluated, wherein a match result is a set of graph nodes matching a current step in the customized rule.

7. The computer-implemented method of claim 4, wherein the customized rule includes a filter to constrain which methods of the code to which the customized rule applies, wherein the filter is parameterized by a predicate and a quantifier.

8. The computer-implemented method of claim 4, wherein the customized rule includes at least one core operation selected from an operation to separate a precondition from an associated postcondition, an operation to load intermediate match results, an operation to load intermediate match results, an operation to interleave a function into the customized rule, and an operation to limit a number of elements in a matching result, wherein the matching result is a set of graph nodes matching a current step in the customized rule.

9. The computer-implemented method of claim 4, wherein the customized rule includes at least one transformer operation which returns a match result that potentially contains new elements.

10. The computer-implemented method of claim 4, wherein the evaluation of the code includes performing a forward data flow analysis in the graph from a given node.

11. The computer-implemented method of claim 4, wherein the evaluation of the code includes performing a backward data flow analysis in the graph from a given node.

12. The computer-implemented method of claim 4, wherein the customized rule includes at least one operation which crosses a method boundary.

13. The computer-implemented method of claim 4, wherein the request includes one or more of the customized rule, an identifier of a location of the customized rule, the code, and an identifier of a location of the code.

14. The computer-implemented method of claim 4, wherein the customized rule is input into a graphical user interface that includes components for editing code, displaying the generated graph, and displaying violations of the customized rule in the displayed graph.

15. A system comprising:
a first one or more electronic devices to implement a code store service in a multi-tenant provider network; and
a second one or more electronic devices to implement a program verification service in the multi-tenant provider network, the program verification service including instructions that upon execution cause the program verification service to:
receive a request to evaluate code stored in the code store service based on a customized rule, wherein the customized rule comprises one or more conditions for which the customized rule is applicable and one or more postconditions to indicate at least one check to perform for a given node in a graph for the code, wherein an application of the customized rule performs one or more of:
an interleave between a backward analysis and forward analysis based on user-specified conditions,
an analysis between sub-graphs by a query from a first sub-graph to a second sub-graph, and
an operation on a sub-graph, storage of a result of the operation on the sub-graph, and usage of the stored result in a subsequent operation;
generate the graph for the code; and
evaluate the code by applying the customized rule to the generated graph.

16. The system of claim 15, wherein the program verification service is to provide a graphical user interface that includes components for editing code, displaying the generated graph, and displaying violations of the customized rule in the displayed graph.

17. The system of claim 15, wherein the request includes one or more of the customized rule, an identifier of a location of the customized rule, the code, and an identifier of a location of the code.

18. The system of claim 15, wherein the customized rule includes a filter to constrain which methods of the code to which the customized rule applies.

19. The system of claim 15, wherein the customized rule includes at least one transformer operation which returns a match result that potentially contains new elements.

20. The system of claim 15, wherein the customized rule includes at least one core operation selected from an operation to separate a precondition from an associated postcondition, an operation to load intermediate match results, an operation to load intermediate match results, an operation to interleave a function into the customized rule, and an operation to limit a number of elements in a matching result, wherein the matching result is a set of graph nodes matching a current step in the customized rule.

* * * * *